US010968284B2

(12) United States Patent
Jankolovits et al.

(10) Patent No.: US 10,968,284 B2
(45) Date of Patent: Apr. 6, 2021

(54) METAL OXIDE PARTICLES WITH UNIFORM MULTI-LAYER POLYMER COATINGS

(71) Applicants: The Regents of the University of California, Oakland, CA (US); Dow Global Technologies LLC, Midland, MI (US); Rohm and Haas Company, Philadelphia, PA (US)

(72) Inventors: Joseph Jankolovits, Berkeley, CA (US); Alexander S. Katz, Richmond, CA (US); Oz M. Gazit, Oakland, CA (US); James C. Bohling, Lansdale, PA (US); John A. Roper, III, Midland, MI (US)

(73) Assignees: The Regents of the University of California, Oakland, CA (US); Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 597 days.

(21) Appl. No.: 15/422,925

(22) Filed: Feb. 2, 2017

(65) Prior Publication Data

US 2017/0145219 A1     May 25, 2017

Related U.S. Application Data

(62) Division of application No. 14/479,113, filed on Sep. 5, 2014, now Pat. No. 9,796,793.

(60) Provisional application No. 61/874,710, filed on Sep. 6, 2013.

(51) Int. Cl.
| | | |
|---|---|---|
| *C08B 37/00* | (2006.01) | |
| *C09D 105/00* | (2006.01) | |
| *C09C 1/36* | (2006.01) | |
| *C09C 3/10* | (2006.01) | |
| *C09C 1/30* | (2006.01) | |
| *B01J 20/32* | (2006.01) | |
| *C08B 11/20* | (2006.01) | |
| *C09C 1/40* | (2006.01) | |
| *C09D 101/28* | (2006.01) | |

(52) U.S. Cl.
CPC ....... *C08B 37/0024* (2013.01); *B01J 20/3204* (2013.01); *B01J 20/3272* (2013.01); *B01J 20/3274* (2013.01); *B01J 20/3278* (2013.01); *B01J 20/3289* (2013.01); *C08B 11/20* (2013.01); *C09C 1/309* (2013.01); *C09C 1/3054* (2013.01); *C09C 1/3072* (2013.01); *C09C 1/3081* (2013.01); *C09C 1/3661* (2013.01); *C09C 1/3676* (2013.01); *C09C 1/3684* (2013.01); *C09C 1/3692* (2013.01); *C09C 1/407* (2013.01); *C09C 3/10* (2013.01); *C09D 101/28* (2013.01); *C09D 105/00* (2013.01); *C01P 2002/88* (2013.01); *C01P 2004/03* (2013.01); *C01P 2004/04* (2013.01)

(58) Field of Classification Search
CPC ... C08B 37/0024; C09C 1/309; C09C 1/3072; C09C 1/3081; C09C 1/3676
USPC ................ 536/124, 123.1, 123.12, 56, 10, 1
See application file for complete search history.

(56) References Cited

U.S. PATENT DOCUMENTS

| | | | |
|---|---|---|---|
| 4,724,207 A | 2/1988 | Hou et al. | |
| 4,889,562 A | 12/1989 | Bugnon et al. | |
| 5,541,316 A * | 7/1996 | Engelskirchen | ........ C08B 15/04 510/361 |
| 6,194,488 B1 | 2/2001 | Chen et al. | |
| 6,197,757 B1 | 3/2001 | Perrier et al. | |
| 6,842,288 B1 | 1/2005 | Liu et al. | |
| 6,951,690 B2 | 10/2005 | Katz et al. | |
| 7,081,488 B2 | 7/2006 | Bardman et al. | |
| 7,579,081 B2 | 8/2009 | Brown | |
| 8,334,044 B2 | 12/2012 | Myung et al. | |
| 2002/0081419 A1 * | 6/2002 | Purbrick | .................. B41M 5/52 428/32.34 |

(Continued)

FOREIGN PATENT DOCUMENTS

| | | |
|---|---|---|
| CN | 1396227 A | 2/2003 |
| EP | 0072684 | 2/1983 |

(Continued)

OTHER PUBLICATIONS

Oz M. Gazit and Alexander Katz ("Grafted Poly (1,4-beta-glucan) Strands on Silica: A Comparative Study of Surface Reactivity as a Function of Grafting Density", LANGMUIR, vol. 28, Nov. 14, 2011-2012, pp. 431-437) (Year: 2011).*
Grieb et al., "Chiral high-performance liquid chromatography with cellulose carbamate-coated phases Influence of support surface chemistry on enantioselectivity", Journal of Chromatography A, 697 (1995) pp. 271-278.
O. M. Gazit et al., "Grafted Poly(1→4-β-glucan) Strands on Silica: A Comparative Study of Surface Reactivity as a Function of Grafting Density", Langmuir, 2012, vol. 28, pp. 431-437.

(Continued)

*Primary Examiner* — Shaojia A Jiang
*Assistant Examiner* — Everett White
(74) *Attorney, Agent, or Firm* — Riverside Law LLP

(57) ABSTRACT

The present invention is a multilayered composite comprising porous metal oxide particles that are covalently bonded by way of inorganic ether groups to one or more sites of a first polyhydroxyl-functionalized polymer. This first polymer is in turn covalently bonded by way of inorganic ether groups to one or more sites of a second polyhydroxyl-functionalized polymer. The multilayered composites can be prepared by contacting porous inorganic-oxide particles with a sufficient amount of OH-reactive crosslinking agent to form metal oxide particles imbibed with the crosslinking agent, and then contacting the inorganic-oxide particles with a solution of polyhydroxyl-functionalized polymer under reactive conditions.

6 Claims, 5 Drawing Sheets

(56) References Cited

U.S. PATENT DOCUMENTS

| | | | |
|---|---|---|---|
| 2003/0072943 | A1 | 4/2003 | Anderson et al. |
| 2003/0185757 | A1 | 10/2003 | Kresse et al. |
| 2005/0123761 | A1 | 6/2005 | Hua et al. |
| 2006/0252872 | A1 | 11/2006 | Jonckheree |
| 2009/0009852 | A1 | 1/2009 | Honeyman et al. |
| 2009/0274634 | A1 | 11/2009 | Collins et al. |
| 2009/0312537 | A1* | 12/2009 | Medoff .......... C08B 15/04 536/63 |
| 2013/0029934 | A1 | 1/2013 | Aita et al. |

FOREIGN PATENT DOCUMENTS

| | | |
|---|---|---|
| EP | 1506766 B1 | 7/2007 |
| EP | 2462915 A1 | 6/2012 |
| WO | 2000077281 A1 | 12/2000 |
| WO | 2005110592 | 11/2005 |
| WO | 2007027711 A1 | 3/2007 |
| WO | 2011119265 A1 | 9/2011 |

OTHER PUBLICATIONS

O. M. Gazit et al., "Understanding the Role of Defect Sites in Glucan Hydrolysis on Surfaces", Journal of the American Chemical Society, 2013, vol. 135, pp. 4398-4402.

J. D. Glennon et al. "Chromatographic Selectivity for Amino Acid Esters and Alkali Metal ions on a Silica Bonded Calix[4]arene Tetraester Stationary Phase", Analytical proceedings Including Analytical Communications, 1994, vol. 31, pp. 33-35.

T. K. Goh et al., "Nanoengineered Films via Surface-Confined Continuous Assembly of Polymers", Small, Wiley-VCH Verlag GmbH & Co. KGaA, Weinhem, 2011, vol. 7, No. 20, pp. 2863-2867.

Hammond, Paula T, "Form and Function in Multilayer Assembly: New Applications at the Nanoscale**", Adv. Mater., Wiley-VHC Verlag GmbH & Co. KGaA, Weinheim, 2004, vol. 16, No. 15, pp. 1271-1293.

Heller, W., "Effects of Macromolecular Compounds in Disperse Systems", Pure. Appl. Chem., 1966, vol. 12, pp. 249-274.

A. Isogai et al. "Preparation of polyuronic acid from cellulose by TEMPO-mediated oxidation", Cellulose, 1998, vol. 5. pp. 153-164.

Y. Itoh et al., "Preparation of Biodegradable Hollow Nanocapsules by Silica Template Method", Chemistry Letters, 2004, vol. 33, No. 12, pp. 1552-1554.

A. Katz et al., "The First Single-Step Immobilization of a Calix[4]-arene onto the Surface of Silica", Chem. Mater., 2002, vol. 14, pp. 3364-3368.

J. F. Klebe et al. "Silyl Celluloses: A New Class of Soluble Cellulose Derivatives". Journal of Polymer Science: Part A-1, 1969, vol. 7, pp. 1947-1958.

D. Mertz et al., "ATRP-mediated continuous assembly of polymers for the preparation of nanoscale films", Chem. Commun., 2011, vol. 47, pp. 12601-12603.

B. O'Shaughnessy et al., "Irreversible adsorption from dilute polymer solutions", The European Physical Journal E., 2003, vol. 11, pp. 213-230.

G. Rydzek et al., "Electrochemically Triggered Assembly of Films: A One-Pot Morphogen-Driven Buildup**", Angew. Chem. Int. Ed., Wiley-VHC Verlag GmbH & Co. KGaA, Weinheim, 2011, vol. 50, pp. 4374-7377.

G. Rydzek et al., "One-pot morphogen driven self-constructing films based on non-covalent host-guest interactions", Soft Matter, 2012, vol. 8, pp. 446-453.

C. Picart et al., "Controlled Degradability of Polysaccharide Multilayer Films in Vitro and in Vivo**" Advanced Functional Materials, Wiley-VHC Verlag GmbH & Co. KGaA, Weinheim, 2005, vol. 15, pp. 1771-1780.

J. E. Seebergh et al., "Depletion Flocculation of Aqueous, Electrosterically-Stabilized Latex Dispersions", Langmuir, 1994, vol. 10, pp. 454-463.

S. Shirashi et al., "Immobilization of β-Clyclodextrin on Silica Gell**", Bull. Chem. Soc. Jpn., 1986, vol. 59, pp. 507-510.

S. G. J. Heijman et al., "Electrostatic and Sterical Stabilization of TiO2 Dispersions", Langmuir, 1995, vol. 11, pp. 422-427.

O'Sullivan, Antoinette C., "Cellulose: the structure slowly unravels", Cellulose, 1997, vol. 4, pp. 173-207.

H. J. Taunton et al., "Interactions between Surfaces Bearing End-Adsorbed Chains in a Good Solvent", Macromolecules, 1990, vol. 23, pp. 571-580.

M. Terbojevich et al., "Mesophase Formation and Chain Rigidity in Cellulose and Derivatives. 3. Aggregation of Cellulose in N,N-Dimethylacetamine-Lithium Chloride", Macromolecules, 1985, vol. 18, pp. 640-646.

Vincent B. "The Effect of Adsorbed Polymers on Dispersion Stability", Advances in Colloid and Interface Science, Amsterdam, Netherlands, 1974, vol. 4, pp. 193-277.

J.-S. Wang et al., "Kinetics and jamming Coverage in a Random Sequential Adsorption of Polymer Chains", Physical Review Letters, 1996, vol. 77, No. 9, pp. 1773-1776.

E. H. H. Wong et al., "Phototriggered Metal-Free Continuous Assembly of Polymers for the Fabrication of Ultrathin Films", ACS Macro Letters 2012.

S. Ye et al., "Multilayer nanocapsules of polysaccharide chitosan and alginate through layer-by-layer assembly direcly on PS nanoparticles for release", Journal of Biomater. Sci. Polymer Edn., 2005, vol. 16, No. 7, pp. 909-923.

B. Zdyrko et al. "Polymer Brushes by the "Grafting to"Method", Macromolecular Rapid Communications, Wiley-VHC Verlag GmbH & Co. KGaA, Weinheim, 2011, vol. 32, pp. 859-869.

Y. Zhang et al., "Single Componet Chitosan Hydrogel Microcapsule from a Layer-by-Layer Approach", Biomacromolecules, 2005, vol. 6, pp. 2365-2369.

Q. Zhao et al., "Hollow chitosan-alginate multilayer microcapsules as drug delivery vehicle: doxorubican loading and in vitro and in vivo studies", Nanomedicine, 2007, vol. 3, pp. 63-74.

H. Zou et al., "Polymer/Silica Nanocomposites: Preparation, Characterization, Properties, and Applications", Chem. Rev., 2008, vol. 108, pp. 3869-3957.

Landfester, Katharina, "Encapsulation Through (Mini) Emulsion Polymerization", Functional Coatings, GHOSH, Swapan K,. Ed., Chapter II, Wiley-VHC Verlag GmbH & Co. KGaA, Weinheim, 2006, pp. 29-66.

E. Bourgeat-Lami et al., "Polymer Encapsulation of Inorganic Particles", Functional Coatings, GHOSH, Swapan K., Ed., Chapter IV, Wiley-VHC Verlag GmbH & Co. KGaA, Weinheim, 2006-85-152.

I. V. Driessche et al., "Encapsulations Through the Sol-Gel Technique and their Applications in Functional coatings", Functional Coatings, Ghosh, Swapan K, Ed., Chapter VIII, Wiley-VHC Verlag GmbH & Co. KGaA, Neinheim, 2006, pp. 259-296.

Tadros. Tharwat F., "General Introduction", Dispersion of Powders in Liquids and Stabilization of Suspensions, First Edition, Chapter I, Wiley-VHC Verlag GmbH 7 Co. KGaA, Wienheim, 2012, pp. 1-16.

Tadros. Tharwat F., "Fundamentals of Wetting and Spreading", Dispersion of Powders in Liquids and Stabilization of Suspensions, First Edition, Chapter II, Wiley-VHC Verlag GmbH & Co. KGaA, Weinheim, 2012, pp. 17-29.

Tadros. Tharwat F., "The Critical Suface Tension of Wetting and the Role of Surfactants in Powder Wetting", Dispersion of Powders in Liquids and Stabilization of Suspensions, First Edition, Chapter III, Wiley-VHC Verlag GmbH 8, Co. KGaA, Weinheim, 2012, pp. 31-47.

Tadros. Tharwat F., "Structure of the Solid-Liquid Interface and Electrostatic Stabilization", Dispersion of Powders in Liquids and Stabilization of Suspensions, First Edition, Chapter IV, Wiley-VHC Verlag GmbH & Co. KGaA, Weinheim, 2012, pp. 49-62.

Tadros. Tharwat F., "Electrokinetic Phenomena and Zeta Potential", Dispersion of Powders in Liquids and Stabilization of Suspensions, First Edition, Chapter V, Wiley-VHC Verlag GmbH & Co. KGaA, Weinheim, 2012, pp. 53-83.

Tadros. Tharwat F., "General Classification of Dispersing Agents and Adsorption of Surfactants at the Solid/Liquid Interface", Dis-

(56) References Cited

OTHER PUBLICATIONS persion of Powders in Liquids and Stabilization of Suspensions, First Edition, Chapter VI, Wiley-VHC Verlag GmbH & Co. KGaA, Weinheim, 2012, pp. 85-105.
Tadros. Tharwat F., "Adsorption and Conformation of Polymeric Surfactants at the Solid-Liquid Interface", Dispersion of Powders in Liquids and Stabilization of Suspensions, First Edition, Chapter VII, Wiley-VHC Verlag GmbH 8, Co. KGaA, Weinheim, 2012, pp. 107-129.
Tadros. Tharwat F., "Stabilization and Destabilization of Suspensions Using Polymeric Surfactants and the Theory of Steric Stabilization", Dispersion of Powders in Liquids and Stabilization of Suspensions, First Edition, Chapter VIII, Wiley-VHC Verlag GmbH & Co. KGaA, Weinheim, 2012, pp. 131-149.
Ghosh, Swapan K. "Functional Coatings and Microencapsulation: A General Perspective," Functional Coatings, Ghosh, Swapan K., Ed., Chapter IV, Wiley-VHC Verlag GmbH & Co. KGaA, Weinheim, 2006, pp. 1-28.
Tadros. Tharwat F., "Properties of Concentrated Suspensions", Dispersion of Powders in Liquids and Stabilization of Suspensions, First Edition, Chapter IX, Wiley-VHC Verlag GmbH & Co. KGaA, Weinheim, 2012, pp. 151-169.
Tadros. Tharwat F., "Sedimentation of Suspensions and Prevention of Formation of Dilatant Sediments", Dispersion of Powders in Liquids and Stabilization of Suspensions, First Edition, Chapter X, Wiley-VHC Verlag GmbH & Co. KGaA, Weinheim, 2012, pp. 171-192.
Tadros. Tharwat F., "Characterization of Suspensions and Assessment of Their Stability", Dispersion of Powders in Liquids and Stabilization of Suspensions, First Edition, Chapter XI, Wiley-VHC Verlag GmbH & Co. KGaA, Weinheim, 2012, pp. 193-217.
Tadros. Tharwat F., "Rheological Techniques forAssessment of Stability of Suspensions", Dispersion of Powders in Liquids and Stabilization of Suspensions, First Edition, Chapter XII, Wiley-VHC Verlag GmbH & Co. KGaA, Weinheim, 2012, pp. 219-241.
Tadros. Tharwat F., "Rheology of Concentrated Suspensions", Dispersion of Powders in Liquids and Stabilization of Suspensions, First Edition, Chapter XIII, Wiley-VHC Verlag GmbH & Co. KGaA, Weinheim, 2012, pp. 243-270.
Tadros. Tharwat F., Index, Dispersion of Powders in Liquids and Stabilization of Suspensions, First Edition, Chapter XIII, Wiley-VHC Verlag GmbH & Co. KGaA, Weinheim, 2012, pp. 271-281.
Z. W. Wicks et al., "What Are Coatings?", Organic Coatings: Science and Technology, Third Edition, Chapter I, John Wiley & Sons, Inc., 2007, pp. 1-6.
Z. W. Wicks et al., "Polymerization and Film Formaton", Organic Coatings: Science and Technology, Third Edition, Chapter II, John Wiley & Sons, Inc., 2007, pp. 7-40.
Z. W. Wicks et al., "Latexes", Organic Coatings: Science and Technology, Third Edition, Chapter IX, John Wiley & Sons, Inc., 2007, pp. 176-198.
Z. W. Wicks et al., "Polyester Resins", Organic Coatings: Science and Technology, Third Edition, Chapter X, John Wiley & Sons, Inc., 2007, pp. 199-212.
Z. W. Wicks et al., "Binders based on Polyisocyanates: Polyurethanes", Organic Coatings: Science and Technology, Third Edition, Chapter XII, John Wiley & Sons, Inc., 2007, pp. 231-270.
Z. W. Wicks et al., "Silicon Derivatives", Organic Coatings: Science and Technology, Third Edition, Chapter XVI, John Wiley & Sons, Inc., 2007, pp. 326-334.
Z. W. Wicks et al., "Pigments", Organic Coatings: and Technology, Third Edition, Chapter XX, John Wiley & Sons, Inc., 2007, pp. 417-434.
Z. W. Wicks et al., "Pigment Dispersion", Organic Coatings: Science and Technology, Third Edition, Chapter XXI, John Wiley & Sons, Inc., 2007, pp. 435-460.
Z. W. Wicks et al., "Effect of Pigments on Coating Properties", Organic Coatings: Science and Technology, Third Edition, Chapter XXII, John Wiley & Sons, Inc., 2007, pp. 461-472.
Landfester, Katherina, "Miniemulsion Polymerization and the Structure of Polymer and Hybrid Nanoparticles**", Angew. Chem. Int. Ed., Wiley-VHC Verlac GmbH & Co. KGaA, Weinheim, 2009, vol. 48, pp. 4488-4507.
K. H. Bae et al., "Chitosan Oligosaccharide-Stabilized Ferrimagnetic Iron Oxide Nanocubes for magnetically Modulated Cancer Hyperthermia", ACS Nano, 2012, vol. 6, pp. 5266-5273.
I. Banerjee et al., "Antifoulnig Coatings: Recent Developments in the Design of Surfaces That Prevent Fouling by Proteins, Bacteria, and marine Organisms", Adv. mater., Wiley-VHC Verlac GmbH & Co. KGaA, Weinheim, 2011, vol. 23, pp. 690-718.
R. Barbey et al., "Polymer Brushes via Surface-Initiated Controlled Radical Polymerization: Synthesis, Characterization, Properties, and Applications", Chem. Rev., 2009, vol. 109, pp. 5437-5527.
A. L. Becker et al., "Small", 2010, vol. 6, No. 17, p. D15063.
P. Bertrand et al., "Ultrathin polymer coatings by complexation of polyelectrolytes at interfaces: suitable materials, structure, and properties", Macromol. Rapid Commun., Wiley-VHC Verlac GmbH & Co. D-69451, Weinheim, 2000, vol. 21, No. 7, pp. 319-348.
T. Boudou et al., "Internal Composition versus the Mechanical Properties of Polyelectrolyte Multilayer Films: the nfluence of Chemical Cross-Linking", Langmuir, 2009, vol. 25, No. 24, pp. 13809-13819.
E. Bourgeat-Lami et al., "Organic/Inorganic Composite Latexes: The marriage of Emulsion Polymerization and Inorganic Chemistry", Adv. Polym. Sci., Springler-Verlag Berlin Heidelberg, 2010.
P. L. Bragd et al., "TEMPO-mediated oxidation of polysacharides: survey of methods and applications", Topics in Catalysis, 2004, vol. 27, Nos. 1-4, pp. 49-66.
J. H. Braun et al., "TiO2 pigment technology: a review", Progress in Organic Coatings, 1992, vol. 20, pp. 105-138.
K. Bridger et al., "Nonaqueous Silica Dispersions Stabilized by Terminally-Grafted Polystyrene Chains", Journal of Colloid and Interface Science, 1979, vol. 68, No. 1 pp. 190-195.
De Bruijn, W. C., "Glycogen, Its Chemistry and Morphologic Appearance in the Electron Microscope", Journal of Ultrastructure research, 1973, vol. 42, Nos. 29-50.
W. C. De Bruijn et al., "Glycogen, its chemistry and morphological appearance in the electron microscope. III. Identification of the tissue ligands involved in the glycogen contrast staining reaction with the osmium(VI)-iron(II) complex", Histochemical Journal, 1976, vol. 8, pp. 121-142.
E. Brynda et al., "Multiple Alternating Molecular Layers of Albymin and Heparin on Solid Surfaces", Journal of Colloid and Interface Science, 1996, vol. 183, pp. 18-25.
E. P. K. Currie et al., "Tethered polymer chains: surface chemistry and their impact on colloidal and surface properties", Advances in Colloid and interface Science, 2003, Vls. 100-102, pp. 205-265.
K. K. Das et al., "Flocculation-dispersion characteristics of alumina using a wide molecular weight range of polyacrylic acids", Colloids and Surfaces A: Physicochem. Eng. Aspects, 2003, vol. 223, pp. 17-25.
Y. Ding et al., "Polymer-Monomer Pairs as a Reaction System for the Synthesis of Magnetic Fe2O4-Polymer Hybrid-Hollow Nanospheres", Angew. Chem. Int. Ed., Wiley-VHC Verlac GmbH & Co. KGaA, Weinheim, 2004, vol. 43, pp. 3369-6372.
S. Edmonson et al., "Polymer brushes via surface-initiated polymerizations", Chem. Soc. Rev., 2004, vol. 33, pp. 14-22.
J. Edwards et al., "Preparation and Stability of Polymer-Grafted Silica Dispersions", ACS Symposium Series, American Chemical Society, Washington, DC, 1984, vol. 240, pp. 281-296.
Farrokhpay, Saeed, "A review of polymeric dispersant stabilisation of titania pigment", Advanes in Colloid and Interface Science, 2009, vol. 151, pp. 24-32.
X. Feng et al., "Mechanical Properties of Polyelectrolyte Complex Films based on Polyvinylamine and Carboxymethyl Cellulose", Ind. Eng. Chem. Res., 2006, vol. 45, pp. 6665-6671.
Q. Gao et al., "pH-Responsive Drug Release from Polymer-Coated Mesoporous Silica Spheres", Journal of Phys. Chem., 2009, vol. 113, pp. 12753-12758.
O. M. Gazit et al., "Grafted cellulose strands on the surface of silica: effect of environment on reactivity", Chem. Commun., 2011, vol. 47, pp. 376-378.

(56) References Cited

OTHER PUBLICATIONS

International Search Report from corresponding International Application No. PCT/US2014/054407 dated Dec. 22, 2014.

Z. W. Wicks et al., "Polymerization and Film Formation", Organic Coatings: Science and Technology, Third Edition, Chapter II, John Wiley & Sons, Inc., 2007, pp. 7-40.

Z. W. Wicks et al., "Pigments", Organic Coatings: Science and Technology, Third Edition, Chapter XX, John Wiley & Sons, Inc., 2007, pp. 417-434.

K. H. Bae et al., "Chitosan Oligosaccharide-Stabilized Femmagnetic Iron Oxide Nanocubes for magnetically Modulated Cancer Hyperthermia", ACS Nano, 2012, vol. 6, pp. 5266-5273.

T. Boudou et al., "Internal Composition versus the Mechanical Properties of Polyelectrolyte Multilayer Films: The Influence of Chemical Cross-Linking", Langmuir, 2009, vol. 25, No. 24, pp. 13809-13819.

E. Bourgeat-Lami et al., "Organic/Inorganic Composite Latexes: The marriage of Emulsion Polymerization and Inorganic Chemistry", Adv. Polym. Sci., Springier-Verlag Berlin Heidelberg, 2010.

P. L. Bragd et al., "Tempo-mediated of polysaccharides: survey of methods and applications", Topics in Catalysis, 2004, vol. 27, Nos. 1-4, pp. 49-66.

Y. Ding et al., "Polymer-Monomer Pairs as a Reaction System for the Synthesis of Magnetic Fe2O4-Polymer Hybrid Hollow Nanospheres", Angew. Chem. Int. Ed., Wiley-VHC Verlac GmbH & Co. KGaA, Weinheim, 2004, vol. 43, pp. 5369-6372.

\* cited by examiner

METAL OXIDE PARTICLES WITH UNIFORM MULTI-LAYER POLYMER COATINGS

RELATED APPLICATION

The present application is a divisional application of U.S. patent application Ser. No. 14/479,113, filed on Sep. 5, 2014, which claims priority to US Provisional Patent Application No. U.S. 61/874,710 filed on Sep. 6, 2013, the contents of all of which are herein incorporated by reference in their entireties.

BACKGROUND

Coating technologies are used broadly to tune the surface characteristics of solid substrates. Polymer coatings are routinely used for biocompatibilization, targeted and controlled release of therapeutics, the synthesis of hollow capsules via template-core etching, and stabilizing dispersions. For example, coatings are applied to protect surfaces from environmental damage or biofouling, alter surface hydrophobicity, make the solid biocompatible, enable covalent modification, or protect against particle aggregation. Covalently grafted polymers on solid supports have certain advantages over physisorbed coatings. Covalently grafted polymer coatings can be more stable at high solids concentrations than physisorbed coatings. They are also not susceptible to bridging or depletion flocculation. Covalently grafted polymers can also be more hydrolytically stable. Synthetic strategies for grafting polymer coatings on solid supports include suspension, dispersion, or emulsion polymerizations, grafting-to strategies, surface-initiated polymerization, as well as layer-by-layer assembly followed by chemical crosslinking. While these synthetic approaches are quite versatile, they possess certain drawbacks that are exemplified by not meeting the low-cost requirements for coating commodity chemicals, such as the titanium dioxide ($TiO_2$) pigment used in paints. Grafting-to approaches frequently lead to low surface coverages and therefore might not provide appropriate coating properties. Grafting-from approaches require the covalent attachment and removal of a polymerization catalyst or chain-transfer agent in order to avoid homopolymerization. Layer-by-Layer synthesis is a multiple-pot process. Suspension, dispersion, and emulsion polymerizations tend to have low-yields of solids in each solution, particularly for less than 100 nm thick coatings. Thus, the prevailing syntheses often require multiple steps and/or low yield syntheses, and result in low surface coverage and/or non-uniform coatings on the nanoscale. As $TiO_2$ and other commodity chemicals require high yield, low cost coating syntheses, an alternative to these multiple step, multiple pot, and low yield approaches would be useful.

Moreover, uniform nanoscale coatings that mitigate the aggregation of inorganic-oxide particles can be invaluable in dispersion applications. In point, the inorganic-oxide particle pigment is often used in large excess due to it aggregation in order to maintain appropriate hiding. As $TiO_2$ is the most energy demanding ingredient in paint products, enhanced dispersion stability is a pressing sustainability issue.

$TiO_2$ is the optimal white pigment for paint due to its significant hiding capacity, stability, low toxicity, and relatively low cost. Agglomeration of $TiO_2$ reduces hiding, requiring the addition of excess pigment in paint formulations to achieve similar optical properties, a significant source of waste in the paint industry. Non-covalent coatings such as surfactants and polyelectrolytes enhance the stability of $TiO_2$ dispersions through steric and/or electrostatic effects. However, non-covalent coatings are prone to bridging and depletion flocculation, particularly at high concentrations. Covalent coatings with high surface coverage, thicknesses of many nanometers, flexibility, and charge have empirically been shown to enhance particle dispersion. The synthetic approaches for grafting polymers on solid supports listed above unfortunately can yield insufficient polymer surface coverage or charge per surface area for stable dispersions, can be unable to obtain coating thicknesses of roughly 5-75 nm, and can have prohibitively high cost.

Providing a more efficient synthesis for an improved polymer coated oxide particle would be of great value to the industry.

SUMMARY

In a first aspect, the present invention is a multilayered composite comprising porous metal oxide particles that are covalently bonded, by way of inorganic ether groups to one or more sites of a first polyhydroxyl-functionalized polymer, which is covalently bonded by way of inorganic ether groups to one or more sites of a second polyhydroxyl-functionalized polymer In a second aspect, the present invention is a process comprising the steps of: a) contacting OH-functionalized porous inorganic-oxide particles with a sufficient amount of OH-reactive crosslinking agent to form metal oxide particles imbibed with the crosslinking agent; and b) contacting the inorganic-oxide particles containing imbibed crosslinking agent with a solution of a polyhydroxyl-functionalized polymer under reactive coupling conditions. The present invention addresses a need by providing a simply way of encapsulating metal oxide particles with polymer.

DETAILED DESCRIPTION OF THE INVENTION

Figure 1A:
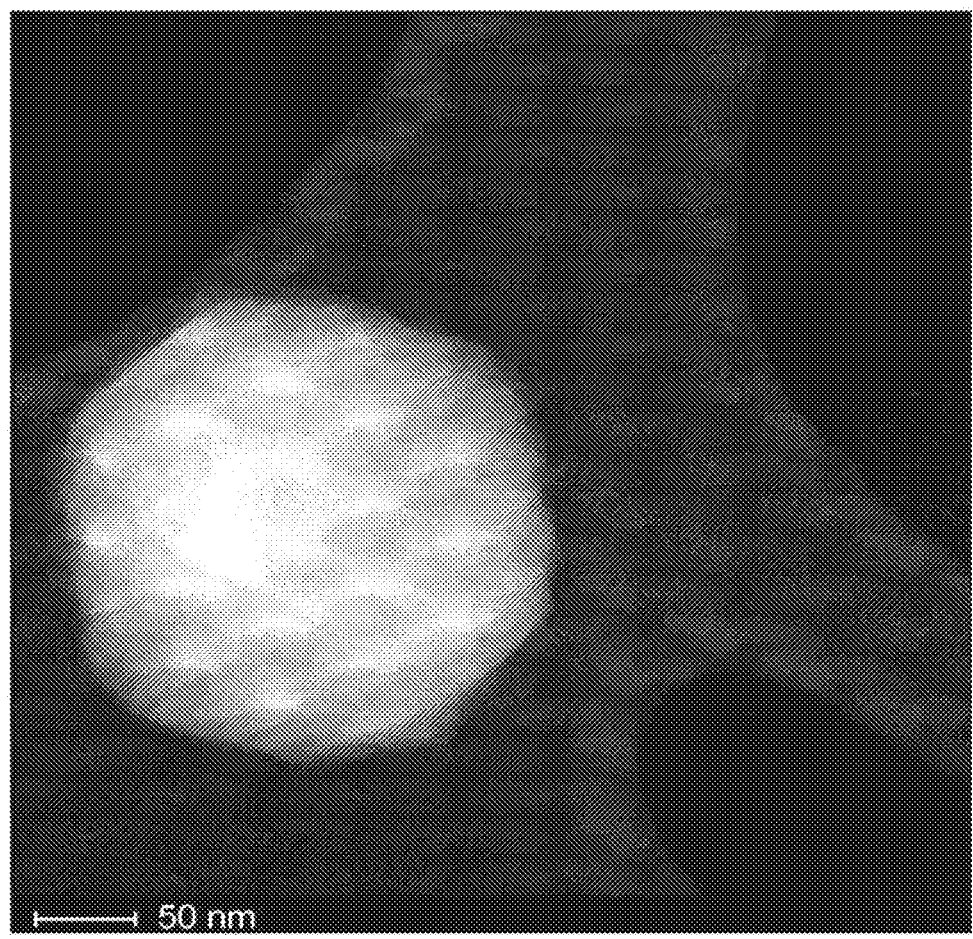
FIG. 1A is a HAADF-STEM micrograph of stained R706-control of Comparative Example 1.

In a first aspect, the present invention is a multilayered composite comprising porous metal oxide particles that are covalently bonded to one or more sites of a first polyhydroxyl-functionalized polymer, which is covalently bonded by way of inorganic ether groups to one or more sites of a second polyhydroxyl-functionalized polymer.

The metal oxide particles are in general any inorganic oxide of a metal. The metal oxide particles are more preferably metal oxides of Ti, Al, Si, Zn, P, Fe, Zr, Mn, Mo, Mg, Cr, Ce, Nb, W, B, or a combination thereof and even more preferably, metal oxides of Ti, Al, or Si, or combinations thereof. In an example of a preferred embodiment, the porous metal oxide particles are particles of $TiO_2$, preferably rutile $TiO_2$, capped with alumina or silica or zirconia or combinations thereof. Alternatively, the porous metal oxide particles comprise a polyoxometallate composition.

The multilayered composite of the present invention is advantageously prepared by first contacting OH-functionalized porous metal oxide particles with a sufficient amount of an OH-reactive metal-containing crosslinking agent to form metal oxide particles reacted with and imbibed with crosslinking agent. Excess unreacted crosslinking agent—if excess is added—is then substantially removed, but not completely removed so that some amount of crosslinking agent remains imbibed in the pores of the metal oxide particles. After removal of sufficient levels of crosslinking agent, the imbibed metal oxide particles are then contacted with a solution of one or more polyhydroxyl-functionalized polymers under reactive coupling conditions to form particles coated with multiple layers of the polymer.

More specifically, the composite comprises a porous metal oxide particle covalently bonded by way of inorganic ether groups of the type O-M-O, where M is Si, Ti, Al, or B to one or more sites of a first polyhydroxyl-functionalized polymer, which is covalently bonded by way of inorganic ether groups to one or more sites of a second polyhydroxyl-functionalized polymer (which may be the same as or different from the first polyhydroxyl-functionalized polymer), which in turn is covalently bonded by way of inorganic ether groups to one or more sites of another polyhydroxyl-functionalized polymer, and so forth. The O of the O-M-O inorganic ether groups is directly connected to either the porous metal oxide particle or to a polyhydroxyl-functionalized polymer, or both. Furthermore, the inorganic ether group, when bonded between two polyhydroxyl-functionalized polymer strands, forms a linkage of the type R—O-M-O—R where each R is a carbon atom on the polymer strand. Preferably, the inorganic ether linkage comprises a single metal atom.

It is believed that the presence of imbibed crosslinker in the pores of the metal oxide particles creates a mechanism for creating multilayer growth outwardly from the surfaces of the particles. The method also provides for a coating of substantially uniform thickness.

The crosslinking agent is one that is capable of forming the O-M-O linkages between the metal oxide particles and the polyhydroxyl-functionalized polymer, as well as between layers of polyhydroxyl-functionalized polymer. In general, crosslinkers are an OH-reactive metal complex comprising any metal M, which reacts with OH functional groups to form M-O bonds. Preferred crosslinkers include $SiCl_4$, $TiCl_4$, $Si(CH_3)Cl_3$ or $Al(CH_3)_3$. In one embodiment crosslinkers include boron containing compounds such as boric acid, borate, or other well known boron containing compounds, which react with OH functional groups to form B—O bonds. In one embodiment, crosslinkers include alkoxides of the aforementioned metals such as $Si(OCH_2CH_3)_4$, $Ti(O^iPr)_4$, and $Al(O^iPr)_3$ (where $^iPr$ represents an isopropyl functional group). In general, it is desirable to add an excess of the crosslinking agent to ensure that particles are fully imbibed and the surface of the particles are fully functionalized. Removal of excess crosslinking agent (that is, excess to what is imbibed), preferably in vauco, is desirable to avoid gellation during the polymer treatment step.

The porous particles used in the present invention have sufficient pore volume to imbibe a sufficient amount of crosslinker to generate the desired number layers of the functionalized polymer, preferably in the range of 0.001 to 5 mL/g, and more preferably in the range of 0.01 to 0.3 mL/g.

Generally the number of layers encapsulating the porous particles is in the range of 5 to 50 and the thickness of polymeric layers is preferably in the range of 5 to 75 nm in the dry state, more preferably in the range of 10 to 30 nm in the dry state.

The polymer is preferably added in the presence of a suitable solvent that is unreactive with the crosslinker such as dimethylacetamide, dimethyl formamide, dimethylsulfoxide, or acetonitrile.

The polyhydroxyl-functionalized polymer can be any suitable polymer. Examples include poly(1→4)-β-glucan, amylopectin, amylose, chitin, chitosan, glycogen, arabinose, xylose, polyvinyl alcohol, poly(2-hydroxyethylmethacrylcate), ethyl cellulose, methyl cellulose, cellulose acetate, 2-hydroxyethyl cellulose, cellulose acetate butyrate, hydroxypropyl cellulose, hydroxypropylmethyl cellulose, carboxymethyl cellulose among other. In one embodiment the polyhydroxyl-functionalized polymers include any oligosaccharide, polyvinyl alcohol, or a cellulose derived poly (1→4) β-glucan. The polyhydroxyl-functionalized polymer can be contacted with the imbibed oxide particle by adding the polymer in solution to the oxide particle. The multilayerd polymer coated composite forms upon contact of the polymer with the imbibed oxide particles. The number of polymer layers formed depends on a variety of factors including the amount of polymer contacted with the oxide particle, the amount of imbibed crosslinker, and the internal porosity of the support.

In a further embodiment of this invention, the polymer can be functionalized after preparation of the multilayered composite. For example, the OH functional groups can be oxidized to carboxylic acid groups, preferably in the presence of a 2,2,6,6-tetramethylpiperidin-1-oxyl (TEMPO) catalyst. The polymer may also be further functionalized by reaction with a haloalkyl quaternary ammonium salt such as 3-chloro-2-hydroxy-N,N,N-trimethylpropylammonium chloride. The polymer may also be functionalized with nonionic groups such as amine groups, alkylene oxide groups or alkyl groups.

One application of such a post-synthetic reaction could include improving the dispersion stability of the composite, by reacting neutral OH functional groups on the polymer and transforming them via oxidation to be negatively charged carboxylate groups.

An example of an application for the composite of the present invention is in the field of drug delivery. A pharmaceutical drug can be encapsulated inside of an oxide particle, and a polymer coating can physically trap the drug inside the particles. The encapsulated drug can then be ingested/injected and be directed to a particular area of interest in the body. Upon hydrolysis of the polymer coating, the drug molecules will be released locally. So in this type of material, the facile hydrolysis of the M-O bonds would be an advantageous approach to triggering drug release compared to a material with a Si—C bond, which degrades more slowly.

Another example of an application for the composite of the present invention is in the field of coatings. It is well known the poor dispersion of metal oxide pigments in coatings leads to inefficient use of these materials along with inferior performance such as reduced light scattering, corrosion resistance, stain resistance, weathering, and the like. It has been found that this invention leads to improved dispersion of metal oxide pigments in coating applications.

SPECIFIC EMBODIMENT OF THE INVENTION

The following examples are provided to further illustrate the composite material and process.

General Experimental Protocols:

All reagents were used as received unless described otherwise. Ti-Pure R-706 (R706) is a commercial pigment sold by DuPont. R706 has a median particle size of 360 µm and is composed of a minimum of 93% rutile titanium dioxide prepared by the chloride process, 2.5 wt. % alumina, and 3 wt. % amorphous silica. Colloidal silica and alumina were obtained as 10-20 nm particles from Aldrich. The surfaces of the colloidal silica and alumina were fully hydroxylated by refluxing the suspension in water overnight. Dimethylacetamide used in the β-glu solution was dried by distillation over calcium hydride under an argon atmosphere. The chlorination and grafting procedures were performed in dry glassware using standard Schlenk techniques in an argon atmosphere or glove box techniques in a nitrogen atmosphere.

Lithium chloride (LiCl) used in the β-glu solution was dried under vacuum at 190° C. overnight. Dichloromethane was dried over alumina in a Glass Contour solvent system. Dry amorphous poly(1→4, β-glucan) powder was prepared from Avicel following a conventional method. The 0.6% wt. β-glu in 0.8% wt. LiCl in dimethyl acetamide (DMAc) solution was prepared by wetting the dry amorphous poly (1→4, β-glucan) powder with anhydrous methanol in a nitrogen glove box, followed by solvent exchange with methanol once and DMAc three times, with the third being performed overnight. The amorphous poly(1→4, β-glucan) powder swelled with DMAc was then dissolved with vigorous magnetic stirring in 8% wt. LiCl/DMAc to make a 6% wt. β-glu solution. This solution was then diluted with dry DMAc to 0.6 wt %β-glu and passed through a 0.2 µm nylon filter in a nitrogen glovebox.

Ethyl cellulose solutions were prepared by first drying ethyl cellulose (Aldrich, 48% ethoxy groups) at 120° C. under vacuum. In a glovebox, ethyl cellulose was dissolved at room temperature in dry DMAc to prepare a 3% wt. solution.

Dynamic light scattering (DLS) and zeta potential measurements were performed on a Malvern Nano-Zetasizer. Size measurements were performed in disposable plastic cuvettes at 25° C. All solutions were filtered through a 0.2 µm syringe filter. Samples were prepared by vortexing and sonicating ~0.1 mg/mL suspensions for at least 15 minutes. After vortexing again to suspend the sedimented particles, the suspensions were diluted approximately 10 fold and given sufficient time to equilibrate to 25° C. before measuring. The results from at least four measurements are averaged and the number-average particle size values are reported.

$N_2$ Physisorption analysis was performed on a Micrometrics ASAP 2020 instrument. Samples were degassed at 110° C. and nitrogen adsorption-desorption isotherms were measured at 77 K.

HAADF-STEM micrographs were recorded using a 200 kV F20 UT Tecnai microscope at the National Center for Electron Microscopy at Lawrence Berkeley National Laboratory. Microscopy samples were prepared by staining with $OsO_4$ and $K_3Fe(CN)_6$. 10 mg of the material was immersed in 1 mL of a 1% osmium tetroxide solution 0.05 M potassium ferricyanide, 0.01 M pH 8.0 aqueous tris buffer solution. The suspensions were vortexed and sonicated for 30 seconds and set to react. After two hours, the solid was isolated by centrifugation, washed twice with 1 mL water and twice with methanol for 15 minutes each, and air dried. To prepare the grids, 0.1 mg/mL of the stained powder was suspended in 1 mL of deionized water. This suspension was sonicated for 15 minutes and one drop was placed on a copper/carbon mesh grid and allowed to evaporate. To visualize the coating better, the black and white HAADF-STEM micrographs were given a red-hue by adjusting the picture temperature and tint in Windows Photo Gallery.

Thermogravimetric analysis (TGA) was performed on a Netzsch 449C Jupiter TGA equipped with a QMS 403 Aelos quadrupole mass spectrometer. The carrier gas was 20% $O_2$, 80% Ar. 20-30 mg of the samples were loaded in alumina crucibles and were equilibrated in the instrument for 30 minutes prior to the measurement. Samples were subject to a temperature ramping at 5° C./min from room temperature to 120° C., holding for 30-60 minutes, and then increasing the temperature at 5° C./min to 800° C. Volatiles were sent through a 230° C. fused silica capillary to the mass spectrometer.

Description of the General Washing Procedure:

After centrifugation, the mother liquor was decanted and the solid was resuspended in about 20 mL of solution with the aid of vortexing and sonication and agitated for at least 2 hours on a spinner. The solid was isolated by centrifugation, preferably at 10,000 G for 10 minutes at room temperature, and subsequent decantation of the solvent. The order of the solvent washes is as follows: twice with 8% wt. lithium chloride (LiCl) in dimethyl acetamide (DMAc) (one of which is performed overnight), once with DMAc, twice with 10% by volume formic acid in methanol (one of which is performed overnight), and twice with water (one of which is performed overnight). After all washing steps, the solid was dried on a freeze dryer and then under vacuum at 120° C. overnight.

Example 1

R706-MIC 23° C.: 1 g of R706 was dried under vacuum at 190° C. for at least five hours in a 100 mL schlenk flask. At room temperature, 6 mL of neat $SiCl_4$ was added via cannula transfer under argon and stirred overnight. In a room temperature water bath, the suspension was partially dried under vacuum by first removing excess $SiCl_4$ by vacuum such that the solid has a dry appearance and constant pressure was reached on a digital vacuum gauge, and secondly by continuing the application of a vacuum for 10 minutes. Separately, 20 g of a solution of 0.6% wt. β-glu dissolved in 0.8% wt. LiCl in DMAc was passed through a 0.2 µm nylon syringe filter in a glovebox. The filtered β-glu solution was added via cannula to the partially dried solid while stirring at 400 rpm under argon at room temperature. After stirring for 3 minutes, the suspension was sonicated for 1 minute and then stirred overnight under argon. The β-glu coated particles were isolated by room temperature centrifugation at 10 kG, and then subject to the standard washing and drying procedure. Yield=0.9693 g.

Example 2

R706-MIC 0° C.: 1 g of R706 was dried under vacuum at 190° C. for at least five hours in a 100 mL Schlenk flask. At room temperature, 6 mL of neat silicon tetrachloride ($SiCl_4$) was added under argon and stirred overnight. In an ice-water bath, the suspension was partially dried by first removing excess $SiCl_4$ under vacuum such that constant pressure was reached on a digital vacuum gauge, and secondly by continuing the application of a vacuum for 10 minutes. Separately, 20 g of 0.6% wt. β-glu dissolved in 0.8% wt. LiCl in DMAc solution was passed through a 0.2 µm nylon syringe filter in a glovebox and cooled to 0° C. in an ice-water bath. The β-glu solution was added via cannula to the partially dried solid while stirring at 400 rpm under argon in an ice-water bath. After stirring for 3 minutes, the suspension was sonicated for 1 minute and then stirred overnight. The particles were isolated by room temperature centrifugation at 10 kG, and then washed using a general washing procedure: 8% wt. LiCl in DMAc (twice, once overnight), DMAc (once), 10% formic acid in methanol by volume (twice, once overnight), and water (twice, once overnight) by subsequent immersion, stirring, centrifugation, and decantation. The particles were dried first on a freeze dryer and lastly under vacuum at 120° C. overnight. Yield=0.489 g.

Comparative Example 1

R706-control: 2 g of R706 was dried under vacuum at 190° C. overnight in a 100 mL schlenk flask. At room temperature, 11 mL of a dichloromethane solution containing 9% by volume $SiCl_4$ was added via cannula transfer under argon and stirred overnight. The suspension was completely dried under vacuum at 60° C. for four hours. Separately, 40 g of a solution of 0.6% wt. β-glu dissolved in 0.8% wt. LiCl in DMAc was passed through a 0.2 µm nylon syringe filter in a glovebox. The room temperature β-glu solution was added via cannula to the dry, chlorinated R706 while stirring at 400 rpm under argon in a room temperature water bath. After stirring for 3 minutes, the suspension was sonicated for 1 minute and then stirred overnight. The particles were isolated by room temperature centrifugation at 10 kG, and then subject to the standard washing and drying procedure. Yield=1.8304 g.

Figure 1B:
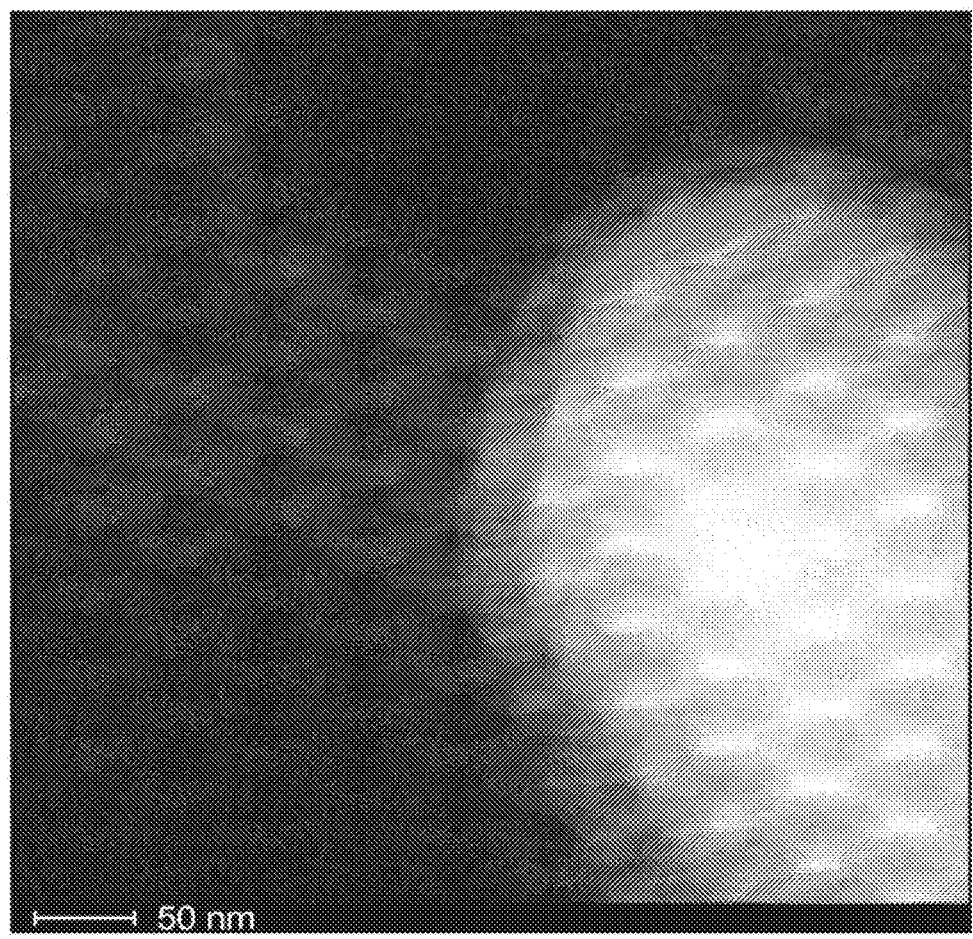
FIG. 1B is a HAADF-STEM micrograph of R706-MIC 23° C. of Example 1.
Figure 1C:
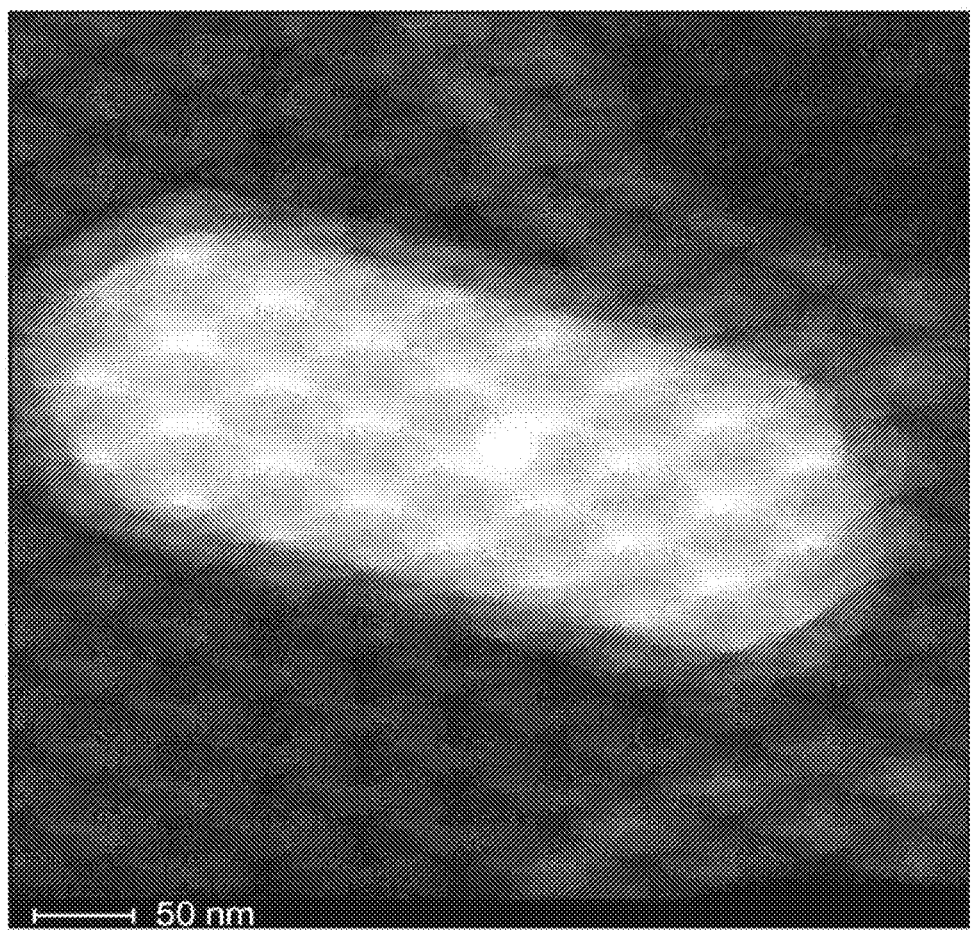
FIG. 1C is a HAADF-STEM micrograph of R706-MIC 0° C. of Example 2.

HAADF-STEM micrographs of the stained R706-control, R706-MIC 23° C., and R706-MIC 0° C. are displayed in FIGS. 1A, 1B and 1C respectively. The uncoated R706-control particles possess a range of particle shapes and sizes. R706 particles contain a layer of precipitated $Al_2O_3$ and $SiO_2$. This coating typically appears to be ~3 nm thick, as shown in FIG. 1A, and due to its inorganic nature, does not experience beam damage on the timescale investigated and observed for the β-glu coating. The R706-MIC 0° C. particles have a uniform ~15-20 nm thick β-glu coating visible in FIG. 1B. The visual contrast of this coating is less than that of the underlying $TiO_2$ particles. The R706-MIC 23° C. particles have a similar β-glu coating that is ~8-20 nm thick in FIG. 1C. Since an individual glucan-layer thickness will be less than 5 nm, the coatings imaged in FIGS. 1B and 1C must represent multilayers. Effectively each R706-MIC 0° C. and R706-MIC 23° C. particle has this coating completely surrounding the $TiO_2$ core with consistent thickness between particles. Beam damage of the organic polymer coating is evident upon prolonged exposure in the microscope (typically 1 minute is sufficient to observe beam damage at 200 kV and magnifications equal to or greater than shown in FIGS. 1B and 1C). This beam damage demonstrates that the coating is an organic material in contrast to the inorganic aluminosilicate coating imaged on the bare R706 in FIG. 1A. FIGS. 1B and 1C demonstrate that the R706-MIC 0° C. and R706-MIC 23° C. materials contain a uniform glucan multilayer coating.

Figure 2:
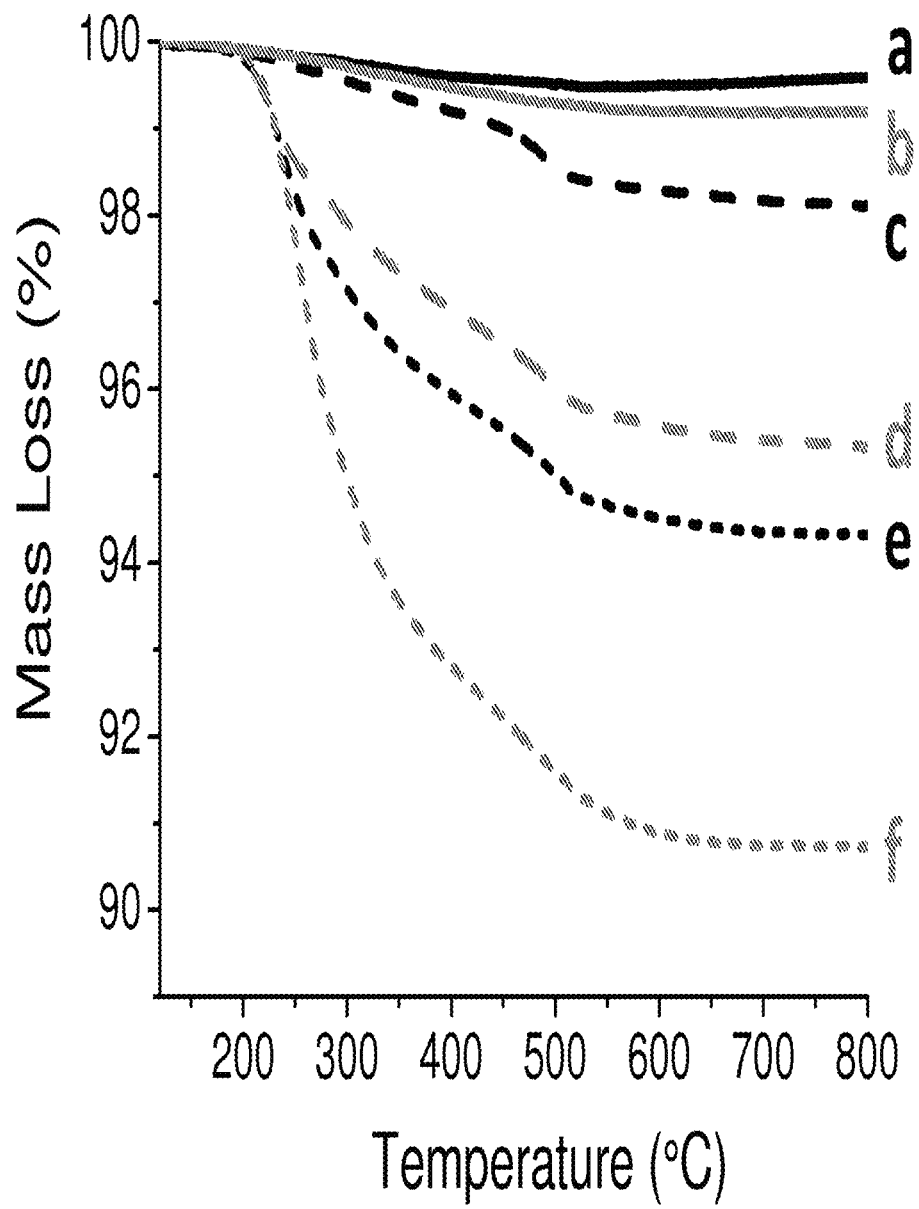
FIG. 2 shows the thermogravimetric analysis of a) R706-control, b) R706-monolayer, c) R706-RC 23° C., d) R706-RC 0° C., e) R706-MIC 23° C., and f) R706-MIC 0° C. of Examples 1 and 2 and comparative Examples 1, 2, and 3.

Thermogravimetric analysis (TGA) was performed to quantify the loading of β-glu on R706. TGA-MS of R706-MIC 0° C. in FIG. 2 shows the removal of surface hydroxyl groups starting at roughly 200° C. CO and $CO_2$ are evident from 220-750° C. indicating the combustion of the β-glu coating in this temperature range. The combustion profile of R706-MIC 0° C. matches previous studies of amorphous β-glu grafted on $SiO_2$ by random irreversible chemisorption. To isolate the mass loading of grafted β-glu using TGA, the R706-control was analyzed to obtain a baseline % mass loss for the support alone, revealing a mass loss of 0.6% from 220-750° C. The mass loss of R706-MIC 0° C. over this temperature range is 8.2% greater than the control (Table 1 below). The mass of grafted β-glu was estimated by treating the non-volatile combustion products as the sum of the masses of the R706 support, $SiO_2$ monolayer added by $SiCl_4$ treatment, and the crosslinks. Thus, R706-MIC 0° C. has an estimated 90 mg of β-glu per g of R706 support. The number of crosslinked β-glu layers on R706-MIC 0° C. was estimated based on the 65% theoretical maximum packing density of a polymer grafted by random irreversible chemisorption at the jamming limit. Based on the geometric footprint of a cellobiose monomer from the crystal structure of cellulose (1.034×0.778 nm) and the 13 $m^2/g$ BET surface area of R706 measured by $N_2$ physisorption, a densely-packed monolayer of β-glu on R706 would have a mass of 5.5 mg. Thus, R706-MIC 0° C. was coated with an estimated 16.4 β-glu layers in a one-pot synthesis. Following the same logic to estimate the coating thickness, a densely packed β-glu strand (0.820 nm wide) would have a thickness of 1.3 nm at the jamming limit. Thus, the 16.4 β-glu layers on R706-MIC 0° C. are an estimated 21 nm thick. This estimate matches the observed thickness by HAADF-STEM in FIG. 1C reasonably well.

R706-MIC 23° C. shows lower β-glu loading than R706-MIC 0° C., corresponding to 9.6 β-glu layers (Table 1 below). The lower loading on R706-MIC 23° C. likely results primarily from less impregnated $SiCl_4$ being retained when evacuating at 23° C. versus room temperature. The variations in polymer loading between R706-MIC 0° C. and R706-MIC 23° C. are consistent with crosslinker impregnation being important in this synthesis. This is because more crosslinker should be retained by performing the evacuation at lower temperatures, and additional crosslinker should be related to greater loading of the glucan polymer.

Comparative Example 2

R706-RC 23° C.: 1 g of R706 was dried under vacuum at 190° C. overnight in a 100 mL schlenk flask. At room temperature, 6 mL of neat silicon tetrachloride ($SiCl_4$) was added via cannula transfer under argon and stirred overnight. In a room temperature water bath, the suspension was partially dried under vacuum by first removing excess $SiCl_4$ by vacuum such that the solid has a dry appearance and constant pressure was reached on a digital vacuum gauge, and secondly by continuing the application of a vacuum for 10 minutes. Next, 10 mL of 0.8% wt. LiCl in DMAc was added via cannula to the partially dried solid at room temperature. After three minutes of stirring, the suspension was sonicated for one minute, and then subjected to further stirring for one hour. Separately, 20 g of a solution of 0.6% wt. β-glu dissolved in 0.8% wt. LiCl in DMAc was passed through a 0.2 µm nylon syringe filter in a glovebox. The room temperature β-glu solution was added via cannula to the partially dried solid while stirring at 400 rpm under argon in a room temperature water bath. After stirring for 3 minutes, the suspension was sonicated for 1 minute and then stirred overnight under argon. The β-glu coated particles were isolated by room temperature centrifugation at 10 kG, and then subject to the standard washing and drying procedure. Yield=0.9679 g.

Comparative Example 3

R706-RC 0° C.: 1 g of R706 was dried under vacuum at 190° C. overnight in a 100 mL schlenk flask. At room temperature, 6 mL of neat SiCl4 was added via cannula transfer under argon and stirred overnight. In an ice-water bath, the suspension was partially dried under vacuum by first removing excess SiCl4 by vacuum such that the solid has a dry appearance and constant pressure was reached on a digital vacuum gauge, and secondly by continuing the application of a vacuum for 10 minutes. Next, 10 mL of 0.8% wt. LiCl in DMAc was cooled in an ice bath and added via cannula to the partially dried solid. After three minutes of stirring, the suspension was sonicated for one minute, and then subjected to further stirring for one hour at 0° C. Separately, 20 g of a solution of 0.6% wt. β-glu dissolved in 0.8% wt. LiCl in DMAc was passed through a 0.2 μm nylon syringe filter in a glovebox and cooled to 0° C. in an ice-water bath. The cold β-glu solution was added via cannula to the partially dried solid while stirring at 400 rpm under argon in an ice-water bath. After stirring for 3 minutes, the suspension was sonicated for 1 minute and then stirred overnight under argon. The β-glu coated particles were isolated by room temperature centrifugation at 10 kG, and then subject to the standard washing and drying procedure. Yield=1.0299 g.

Figure 1D:
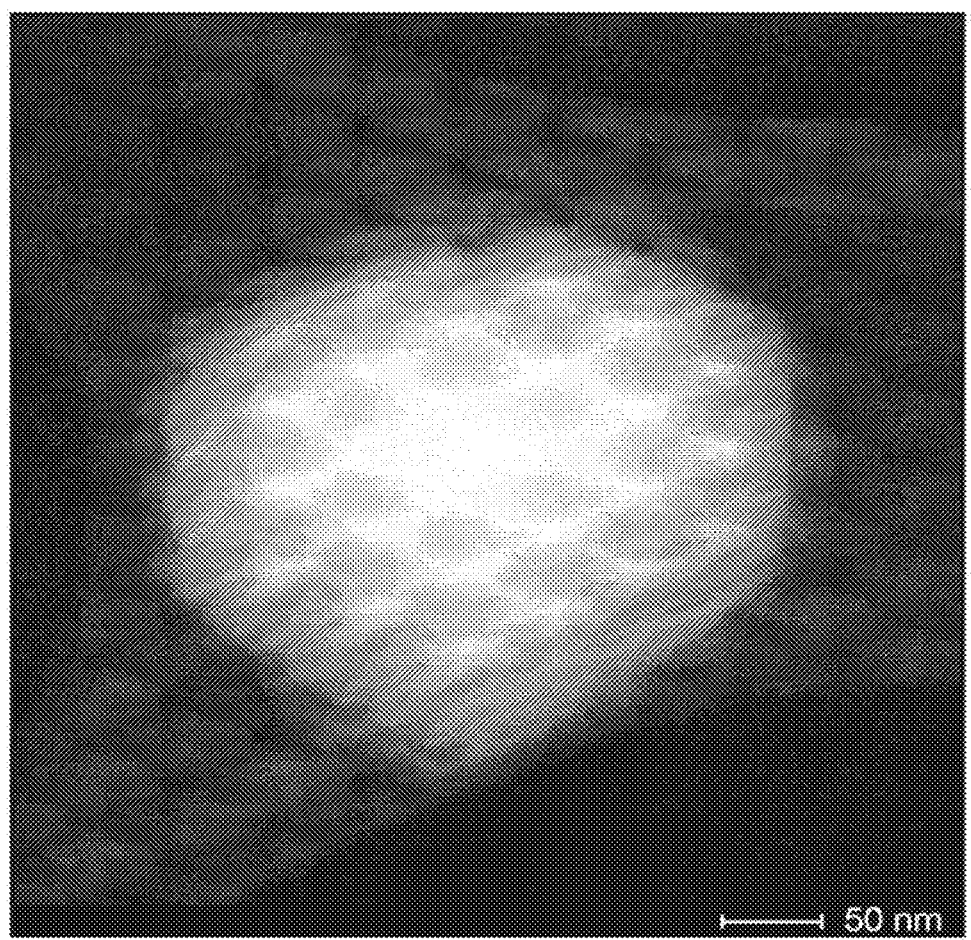
FIG. 1D is a HAADF-STEM micrograph of R706-RC 23° of Comparative Example 2.

To address the benefits of crosslinker impregnation during coating synthesis, Comparative Examples 2 and 3 (R706-RC 23° C. and R706-RC 0° C.) materials were prepared in which the impregnated crosslinker was intentionally released prior to adding the β-glu solution by adding dry 0.8% wt. LiCl/DMAc solution after the SiCl4 evacuation step. In these syntheses, SiCl4 diffuses from the R706 particle prior to adding the β-glu solution. The quantity of SiCl$_4$ in the reaction mixture is otherwise unchanged relative to Example 1. Lower β-glu loadings are achieved when the SiCl$_4$ is released based on TGA (Table 1). HAADF-STEM micrographs in FIG. 1D of R706-RC-23° C. particles show a patchy and less uniform β-glu coating than R706-MIC-23° C. (FIG. 1B). The multilayer coating in FIG. 1D appears on average to be significantly thinner, comprising a thickness between 1-5 nm, when compared with FIG. 1B. Furthermore, the micrograph shown in FIG. 1D contains areas of high and low contrast within the multilayer coating, whereas the micrograph of FIG. 1B comprises a multilayer coating of uniformly high contrast. These data demonstrate impregnation leads to unique uniform multilayer polymer coatings.

TABLE 1

Analysis of the mass loading and coverage of β-glu multilayers on R706 and SiO$_2$ supports based on TGA.

| Sample | Mass loss vs. contro (%) | Est. β-glu loading (mg/g support) | Est. # of β-glu layers |
|---|---|---|---|
| R706-MIC 0° C. | 8.2 | 90 | 16.4 |
| R706-MIC 23° C. | 5.0 | 53 | 9.6 |
| R706-RC 0° C. | 4.0 | 42 | 7.7 |
| R706-RC 23° C. | 1.2 | 12 | 2.2 |
| R706-monolayer | 0.2 | 1.6 | 0.3 |
| R706-EC-MIC 23° C. | 5.2 | 55 | 10 |
| SiO$_2$-MIC 23° C. | 16.8 | 215 | 5.0 |
| SiO$_2$-monolayer | 0.6 | 5.8 | 0.1 |

Comparative Example 4

An R706 material was prepared by completely evacuating the imbibed crosslinker to demonstrate the importance of the imbibed crosslinker in achieving a sufficient coating.

R706-monolayer: 2 g of R706 was dried under vacuum at 190° C. overnight in a 100 mL schlenk flask. At room temperature, 11 mL of a dichloromethane solution containing 9% by volume SiCl$_4$ was added via cannula transfer under argon and stirred overnight. The suspension was completely dried under vacuum at 60° C. for four hours. Separately, 40 g of a solution of 0.6% wt. β-glu dissolved in 0.8% wt. LiCl in DMAc was passed through a 0.2 μm nylon syringe filter in a glovebox. The room temperature β-glu solution was added via cannula to the dry, chlorinated R706 while stirring at 400 rpm under argon in a room temperature water bath. After stirring for 3 minutes, the suspension was sonicated for 1 minute and then stirred overnight. The particles were isolated by room temperature centrifugation at 10 kG, and then subject to the standard washing and drying procedure. Yield=1.9788 g.

TGA of R706-monolayer shows only 0.16% mass loss attributed to β-glu combustion, corresponding to 0.3 densely packed monolayers. The stark contrast in β-glu loading between the R706-monolayer and R706-MIC 0° C. and R706-MIC 23° C. shows that the impregnated crosslinker is necessary for achieving a multilayered coating.

Example 3

R706 was coated with ethyl cellulose (R706-EC-MIC 23° C.) using a nearly identical synthetic approach as the R706-MIC 23° C. material coated with β-glu.

R706-EC-MIC 23° C.: 1 g of R706 was dried under vacuum at 190° C. overnight in a 100 mL schlenk flask. At room temperature, 6 mL of neat SiCl$_4$ was added via cannula transfer under argon and stirred overnight. In a room temperature water bath, the suspension was partially dried under vacuum by first removing excess SiCl$_4$ by vacuum such that the solid has a dry appearance and constant pressure was reached on a digital vacuum gauge, and secondly by continuing the application of a vacuum for 10 minutes. 20 g of a 0.6% wt. ethyl cellulose solution was added via cannula to the partially dried solid while stirring at 400 rpm under argon at room temperature. After stirring for 3 minutes, the suspension was sonicated for 1 minute and then stirred overnight under argon. The ethyl cellulose coated particles were isolated by room temperature centrifugation at 10 kG, and then washed twice with DMAc (one of which is performed overnight), twice with 10% by volume formic acid in methanol (one of which is performed overnight), and twice with water (one of which is performed overnight). The solid was dried on a freeze dryer and subsequently dried under vacuum at 120° C. overnight. Yield=0.9712 g.

The R706-EC-MIC 23° C. material has an ~10-15 nm coating thickness based on STEM. The ethyl cellulose loading is approximately 55 mg/g, which parallels the β-glu analogue R706-MIC 23° C. HAADF-STEM of R706-EC-MIC-23° C. reveals an ~10 nm thick polymer coating. These data support the described coating synthesis strategy is general for multiple polyhydroxylated polymers.

Example 4

A β-glu multilayers coating was prepared on SiO$_2$ (SiO$_2$-MIC 23° C.) to demonstrate that the synthetic method and materials are applicable to different inorganic-oxide particles.

SiO$_2$-MIC 23° C.: 0.5 g of SiO$_2$ was dried under vacuum at 190° C. overnight in a 100 mL schlenk flask. At room temperature, 6 mL of neat SiCl$_4$ was added via cannula transfer under argon and stirred overnight. In a room temperature water bath, the suspension was partially dried under vacuum by first removing excess SiCl$_4$ such that the solid has a dry appearance and constant pressure was reached on a digital vacuum gauge, and secondly by continuing the application of a vacuum for 10 minutes. Separately, 20 g of a solution of 0.6% wt. β-glu dissolved in 0.8% wt. LiCl in DMAc was passed through a 0.2 μm nylon syringe filter in a glovebox. The filtered β-glu solution was added via cannula to the partially dried solid while stirring at 400 rpm under argon at room temperature. After stirring for 3 minutes, the suspension was sonicated for 1 minute and then stirred overnight under argon. The β-glu coated particles were isolated by room temperature centrifugation at 10 kG, and then subject to the standard washing and drying procedure. Yield=0.4998 g.

Comparative Example 5

SiO$_2$-control: 1 g of SiO$_2$ was dried under vacuum at 190° C. overnight in a 100 mL schlenk flask. At room temperature, 11 mL of a dichloromethane solution containing 9% by volume SiCl$_4$ was added via cannu$_1$a transfer under argon and stirred overnight. The suspension was completely dried under vacuum at 60° C. for four hours. Separately, 40 g of a solution of 0.6% wt. β-glu dissolved in 0.8% wt. LiCl in DMAc was passed through a 0.2 μm nylon syringe filter in a glovebox. The room temperature β-glu solution was added via cannula to the dry, chlorinated R706 while stirring at 400 rpm under argon in a room temperature water bath. After stirring for 3 minutes, the suspension was sonicated for 1 minute and then stirred overnight. The particles were isolated by room temperature centrifugation at 10 kG, and then subject to the standard washing and drying procedure. Yield=0.8941 g.

Comparative Example 6

SiO$_2$-monolayer: 1 g of SiO2 was dried under vacuum at 190° C. overnight in a 100 mL schlenk flask. At room temperature, 11 mL of a dichloromethane solution containing 9% by volume SiCl$_4$ was added via cannula transfer under argon and stirred overnight. The suspension was completely dried under vacuum at 60° C. for four hours. Separately, 40 g of a solution of 0.6% wt. β-glu dissolved in 0.8% wt. LiCl in DMAc was passed through a 0.2 μm nylon syringe filter in a glovebox. The room temperature β-glu solution was added via cannula to the dry, chlorinated R706 while stirring at 400 rpm under argon in a room temperature water bath. After stirring for 3 minutes, the suspension was sonicated for 1 minute and then stirred overnight. The particles were isolated by room temperature centrifugation at 10 kG, and then subject to the standard washing and drying procedure. Yield=0.8941 g.

SiO$_2$-MIC 23° C. showed a 15.8% greater mass loss than the SiO$_2$-control sample An estimated 215.5 mg of β-glu is grafted per g of SiO$_2$, corresponding to 5.0 β-glu layers being grafted in the one-pot procedure. A SiO$_2$-monolayer material was prepared to further demonstrate the importance of the impregnated crosslinker in this synthesis. TGA revealed SiO$_2$-monolayer had a 0.55% mass loading of β-glu, corresponding to 0.1 monolayers. These data demonstrate that the coating strategy and the beneficial aspects of multilayer coating via impregnation are general for multiple oxide particles.

Example 5

The synthetic strategy was also applied to Al$_2$O$_3$ particles using trimethylaluminum as the crosslinking agent.

Synthesis of Al$_2$O$_3$-MIC 23° C.: 1 g of colloidal alumina was dried at 190° C. on a vacuum line. The flask was charged with argon and 1 mL of a 2 M trimethylaluminum solution in dichloromethane was added via syringe. After stirring for 1 hour, the suspension was dried on a vacuum line to constant vacuum, and then dried further at 110° C. for 30 minutes. Separately, 42 mg of a 0.5% wt. β-glu in 1.3% wt. LiCl in DMAc solution was passed through a 0.2 μm syringe filter in a nitrogen glovebox and then transferred via cannula to the alumina while stirring at 400 rpm under argon. After stirring overnight, the solid was collected by centrifugation at 18000 G and subjected to a modified version of the standard washing procedure where the two washes with 10% by volume formic acid in methanol were replaced by a single wash in methanol. After freeze drying, the solid was dried at 120° C. for four hours under vacuum.

Comparative Example 6

An alumina sample with no β-glu, Al$_2$O$_3$-control, was prepared following a modified procedure for Al$_2$O$_3$-MIC 23° C. using a grafting solution containing no β-glu, only 40 g of 1.3% LiCl in DMAc. A material coated with β-glu prepared with the trimethylaluminum crosslinker having been completely removed (Al$_2$O$_3$-monolayer) was prepared following a modified procedure for Al$_2$O$_3$-MIC 23° C., where the suspension of alumina and 2 M trimethylaluminum in dichloromethane was dried under vacuum for four hours at 110° C. instead of 30 minutes. Otherwise the syntheses were identical.

TGA-MS of Al$_2$O$_3$-MIC-23° C. revealed the release of CO and CO$_2$ from 200-750° C., which is consistent with β-glu combustion. The surface area of the alumina is 100 m$^2$/g. Following similar reasoning as with Example 1, a monolayer of β-glu on alumina would add approximately 29.6 mg of β-glu per gram of alumina. The Al$_2$O$_3$-control shows a mass loss of 4.3% from 200-750° C., corresponding to surface hydroxyl residues and physisorbed substrates. This value was subtracted from the mass losses for Al$_2$O$_3$-MIC-23° C. and Al$_2$O$_3$-monolayer to determine that these materials have roughly 6.5 and 0.5 β-glu layers, respectively. The simultaneous grafting of polymer layers on alumina using trimethylaluminum with Al$_2$O$_3$-MIC-23° C. underscores the generality of these compositions of matter and the synthetic process, as they are general to a variety of solids and using a variety of crosslinking agents.

Example 6

Benefits of a β-glu coating for improving dispersion stability and covalent modification of the grafted multilayer coating to further improve the dispersion stability are demonstrated.

Polymer coatings can mitigate the aggregation and sedimentation of TiO$_2$ pigments, which is beneficial for paint applications. The effectiveness of the multilayered β-glucan coating in improving the dispersion stability of R706 was assessed below. Moreover, polymer multilayer coated solids can be tuned post-synthetically by covalent modification of the polymer. Covalent modification of the polymer coating is beneficial because it allows the chemical properties of the coating to be altered for a particular application. In this example, the coating is made to possess a negative charge by introducing multiple carboxylate groups via TEMPO catalyzed oxidation of the C6 primary alcohol to a carboxylate. Complete conversion to carboxylates is expected based on the use of an excess of the stoichiometric hypochlorite oxidant and known treatment times. The negatively charged carboxylate groups appear to increase the dispersion stability of the polymer coated pigment particles.

TEMPO Catalyzed Oxidation of the β-Glu Coating 200 mg of the β-glu coated R706 material was mixed with TEMPO (0.005 mmol, 0.8 mg), sodium bromide (0.05 mmol, 5.1 mg), and a 10-15% aqueous solution of sodium hypochlorite (Aldrich, ~0.2 mmol, 560 μL) in 15 mL of water. The pH was adjusted to between 10.5 and 11.0 with a 0.5 M solution of sodium hydroxide. As the reaction progressed over the course of ~90 minutes, additional sodium hydroxide was added to maintain a pH between 10.5 and 11.0. Once the pH ceased decreasing, the solid was isolated by centrifugation and washed twice with water for 30 minutes and once with water overnight. The solid was dried on a freeze dryer and further dried at 120° C. overnight.

Yields: R706-MIC 0° C.=189.4 mg
R706-MIC 23° C.=177.1 mg
R706-RC 0° C.=168.3 mg
R706-RC 23° C.=158.6 mg
R706-monolayer=129.8 mg The dispersion stability of the particles was investigated by preparing 1 mg/mL suspensions in 10 mM pH 8.0 aq. tris buffer. The suspensions were sonicated for at least 15 minutes at room temperature and then subject to centrifugation at 1500 G for 90 seconds. The light transmittance at 310 nm through the suspension was used to assess dispersion stability, as pigment aggregation and subsequent sedimentation in less stable dispersions leads to greater light transmittance.

TABLE 2

Light transmittance of 1 mg/mL dispersions of the composite materials in 10 mM pH 8.0 aqueous tris buffer following centrifugation at 1500 G for 90 seconds.

| | Percent Transmittance @ 310 nm | |
|---|---|---|
| Sample | Unmodified Composite | Carboxylated Composite |
| R706 | 101 ± 6 | — |
| R706-control | 95 ± 5 | — |
| R706-MIC 23° C. | 64 ± 3 | 25 ± 1 |
| R706-MIC 0° C. | 33 ± 2 | 8 ± 1 |

Table 2 shows that the glucan coated R706 pigments coated via the present impregnation approach (R706-MIC-0° C. and R706-MIC-23° C.) have improved dispersion stability relative to the R706-materials with no coating. Moreover, the pigments with carboxylated coatings have better dispersion stability than the pigments with an unmodified glucan coating, supporting that covalent modification of the coatings can lead to improvements in the properties of the particles.

In summary, provided is a process for providing nanoscale polymer coatings on oxide particles that relies on crosslinker impregnation to localize polymer multilayer growth from the surface out. The resulting composite coated particle has polyhydroxyl-functionalized polymers blended in layers through inorganic ether groups with no binding with carbon through the metal atom of the inorganic ether group. The polymer multilayers have uniform thickness and surface coverage, the synthesis is highly reproducible, and the materials seem to be free of crosslinked polymer colloid impurities. The multilayer polymer coatings have promise in more sustainable paints based on their facile syntheses and dispersion stabilizing capabilities. The physisorbed polyelectrolyte coatings currently used in paint formulations have limited performance at high $TiO_2$ concentrations, which is due in part to their weak, reversible binding, bridging flocculation and depletion flocculation. Despite the promise of covalently grafted nanoscopic coatings for mitigating pigment aggregation, shortcomings in the prevailing synthetic methods have prevented their adoption. The present approach has the potential to fill this need. Moreover, the polymer coating should have a similar topology to crosslinked coatings prepared layer-by-layer. Crosslinked layer-by-layer materials already have broad utility in biomedical coatings and targeted drug delivery. Because the present approach avoids the cumbersome multiple-pot synthesis of crosslinked layer-by-layer materials and utilizes biocompatible building blocks, it is expected to find broad applicability in areas including paints and coatings, as demonstrated here, as well as biomaterials in the future.

While the foregoing written description of the invention enables one of ordinary skill to make and use what is considered presently to be the best mode thereof, those of ordinary skill will understand and appreciate the existence of variations, combination, and equivalents of the specific embodiment, method, and examples therein. The invention should therefore not be limited by the above described embodiment, method and examples, but by all embodiments and methods within the scope and spirit of the inventions and the claims appended therein.

What is claimed is:

1. A process for preparing a multilayer composite comprising the steps of:
   a) contacting OH-functionalized porous inorganic-oxide particles with an excess of OH-reactive crosslinking agent to form metal oxide particles imbibed with the crosslinking agent; and
   b) contacting the inorganic-oxide particles containing imbibed crosslinking agent with a solution of a polyhydroxyl-functionalized polymer under reactive coupling conditions;
   wherein between steps a) and b), crosslinking agent neither bonded to nor imbibed with the inorganic-oxide particles is substantially, but not completely removed; and
   where the inorganic oxides are oxides of Ti, Al, Si, Zn, Fe, Zr, Mn, Mg, Cr, Ce, Nb, W, B, or a combination thereof.

2. The process of claim 1, wherein the inorganic oxide particles comprise rutile titanium dioxide particles capped with alumina, zirconia, or silica or a combination thereof.

3. The process of claim 1, wherein the polyhydroxyl-functionalized polymer comprises an oligosaccharide.

4. The process of claim 1, wherein after step b), the polyhydroxyl-functionalized polymer is oxidized to form carboxylic acid groups on the polymer.

5. The process of claim 1, wherein after step b), the polyhydroxyl-functionalized polymer is contacted with a haloalkyl quaternary ammonium salt to form quaternary salt groups on the polymer.

6. The process of claim 1, where the crosslinking agent is $SiCl_4$, $TiCl_4$, $Al(CH_3)_3$, $Si(CH_3)Cl_3$, $Si(OCH_2CH_3)_4$, $Ti(OiPr)_4$, or $Al(OiPr)_3$.

* * * * *